United States Patent [19]

Lunau et al.

[11] Patent Number: 5,056,753

[45] Date of Patent: Oct. 15, 1991

[54] SAFETY SUPPORT STRUCTURE

[76] Inventors: Kevin R. Lunau, 3286 Michaud Avenue, Mississauga, Ontario, L4T 1P7; Geoffrey R. Fernie, 29 Blaketon Road, Etobicoke, Ontario, M9B 4W4; Stephen P. Reed, 59 Spadina Road, Apt. 103, Toronto, Ontario, M5R 2T2, all of Canada

[21] Appl. No.: 320,061

[22] Filed: Mar. 7, 1989

[51] Int. Cl.[5] .......... F16M 13/00

[52] U.S. Cl. .......... 248/542; 248/200.1; 248/218.4; 248/354.3

[58] Field of Search .......... 248/542, 543, 200.1, 248/354.3, 230, 218.4; 211/187, 190, 193; 403/27; 108/107, 109, 111, 144

[56] References Cited

U.S. PATENT DOCUMENTS

| | | | |
|---|---|---|---|
| 856,316 | 6/1907 | Thurston | 248/200.1 X |
| 1,485,572 | 3/1924 | Stoltz | 248/200.1 X |
| 2,979,297 | 4/1961 | Suozzo | 248/542 |
| 3,822,850 | 7/1974 | Elias | 248/542 X |
| 3,880,394 | 4/1975 | Wisecarver | 248/354.3 |
| 4,101,036 | 7/1978 | Craig | 248/200.1 X |
| 4,527,490 | 7/1985 | Tipton et al. | 108/108 X |
| 4,656,952 | 4/1987 | Schweizer | 108/144 X |

FOREIGN PATENT DOCUMENTS

| | | | |
|---|---|---|---|
| 869333 | 3/1953 | Fed. Rep. of Germany | 248/354.3 |
| 1139841 | 7/1957 | France | 248/354.3 |
| 1537254 | 12/1978 | United Kingdom | 248/542 |

*Primary Examiner*—Karen J. Chotkowski
*Attorney, Agent, or Firm*—Thomas A. O'Rourke

[57] ABSTRACT

A safety support structure is provided which comprises a post with upper and lower ends adapted to abut firmly against a ceiling surface and a floor surface, and an accessory mounting region disposed between the upper end and the lower end. The post has a length adjustment means and a pressure indicating means to indicate whether the pressure on the structure, when positioned between a floor surface and ceiling surface, lies inside or outside a predetermined range so as to avoid inflicting damage on the floor or ceiling and to inhibit slippage of the post. The accessory mounting region carries mounting formations, to cooperate with laterally extending support accessories clamped to it and positively to resist axial and/or rotational displacement of the support accessories relative to the post.

16 Claims, 7 Drawing Sheets

SAFETY SUPPORT STRUCTURE

The present invention relates to safety support structures and to such structures which are capable of receiving and cooperating with laterally extending support accessories.

BACKGROUND OF THE INVENTION

There is a need to provide, in private homes, hospitals, rehabilitation centers, homes for the aged and elsewhere, support structures which an infirm or partially incapacitated person may use for assistance in raising and lowering themselves between lying, sitting and standing positions, and in moving about. There is also a need to provide structures which can support shelves, bedside trays, toilet paper holders, etc. to aid the infirm or partially incapacitated person.

Safety support devices are known in the art. One type of support device is in the form of handrails which are fastened to the walls of the home via bolts or screws to provide a support structure. Although the handrails provide the necessary support for a user, a problem exists in that the fasteners securing the handrails must penetrate the walls which leaves holes in the walls if the handrails are to be removed. Furthermore, the handrails only provide a usable support structure near the walls of the home.

Other known safety support devices generally comprise a post having an upper end for abutment against or fastening to a ceiling and a lower end for abutment against or fastening to a floor. The post may be adjustable such that once it is in the correct position, it may be longitudinally extended, thereby causing the upper and lower ends to abut firmly against the ceiling and floor, respectively, and to accommodate different room heights. Once installed, the structure should provide the necessary safety support and reduce the likelihood of lateral displacement of the post due to lateral pulling and impacts thereon, e.g. from fails.

These known structures are deficient in that during installation thereof, the installer must approximate the required longitudinal pressure to be placed on the upper end and lower end to ensure that they are properly and safely installed. If the longitudinal pressure is too low, the post may not provide an individual with sufficient support, and the individual might pull the post out of position, with consequent dangers to the individual. If the longitudinal pressure is too high, the upper and lower ends may damage the surfaces against which they abut. This is especially true in the case of drywall surfaces where, if the longitudinal pressure is too high, the end of the structure abutting against the drywall may buckle and/or crush it.

Thus, it would be advantageous to have a safety support structure which, when installed, provides the necessary lateral support during use by an individual without putting the floor or ceiling surfaces at unnecessary risk during the installation of the safety support structure.

Moreover, prior art structures normally comprise a single post, adapted to be mounted vertically in a room. Such structures proved support only in very restricted locations, and are only useful for an individual within reach of them. They serve little if any additional purpose.

SUMMARY OF THE INVENTION

It is therefore an object of the present invention to provide a novel safety support structure.

Accordingly, the present invention provides a safety support structure comprising:

a post having an upper end adapted to abut firmly against a ceiling surface, a lower end adapted to abut firmly against a floor surface, and an accessory mounting region disposed between the upper end and the lower end;

length adjustment means on the post, for adjusting the unstressed length of the post between its upper end and its lower end; and pressure indicating means on the post, adapted to indicate whether the pressure on the structure, when positioned to abut against a floor surface and a ceiling surface as aforesaid, lies inside or outside a predetermined range;

wherein the accessory mounting region comprises an intermediate length of the post carrying mounting formations, the mounting formations being in the form of a plurality of longitudinally spaced ribs and being adapted, to receive and cooperate with laterally extending support accessories clamped to the accessory mounting region and positively to resist displacement of the support accessory relative to the post.

BRIEF DESCRIPTION OF THE DRAWINGS

In the drawings, which illustrate particular, preferred embodiments of the present invention, and wherein like reference numerals refer to like parts.

DESCRIPTION OF THE PREFERRED EMBODIMENTS

Figure 1:
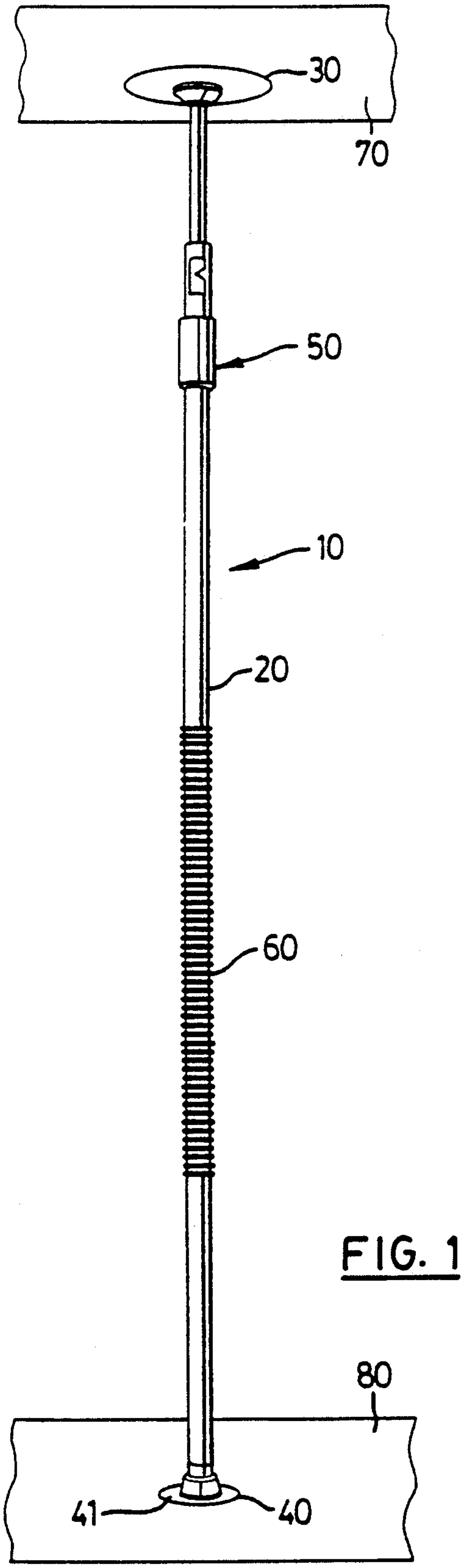
FIG. 1 is a perspective view of a safety support structure.
Figure 2:
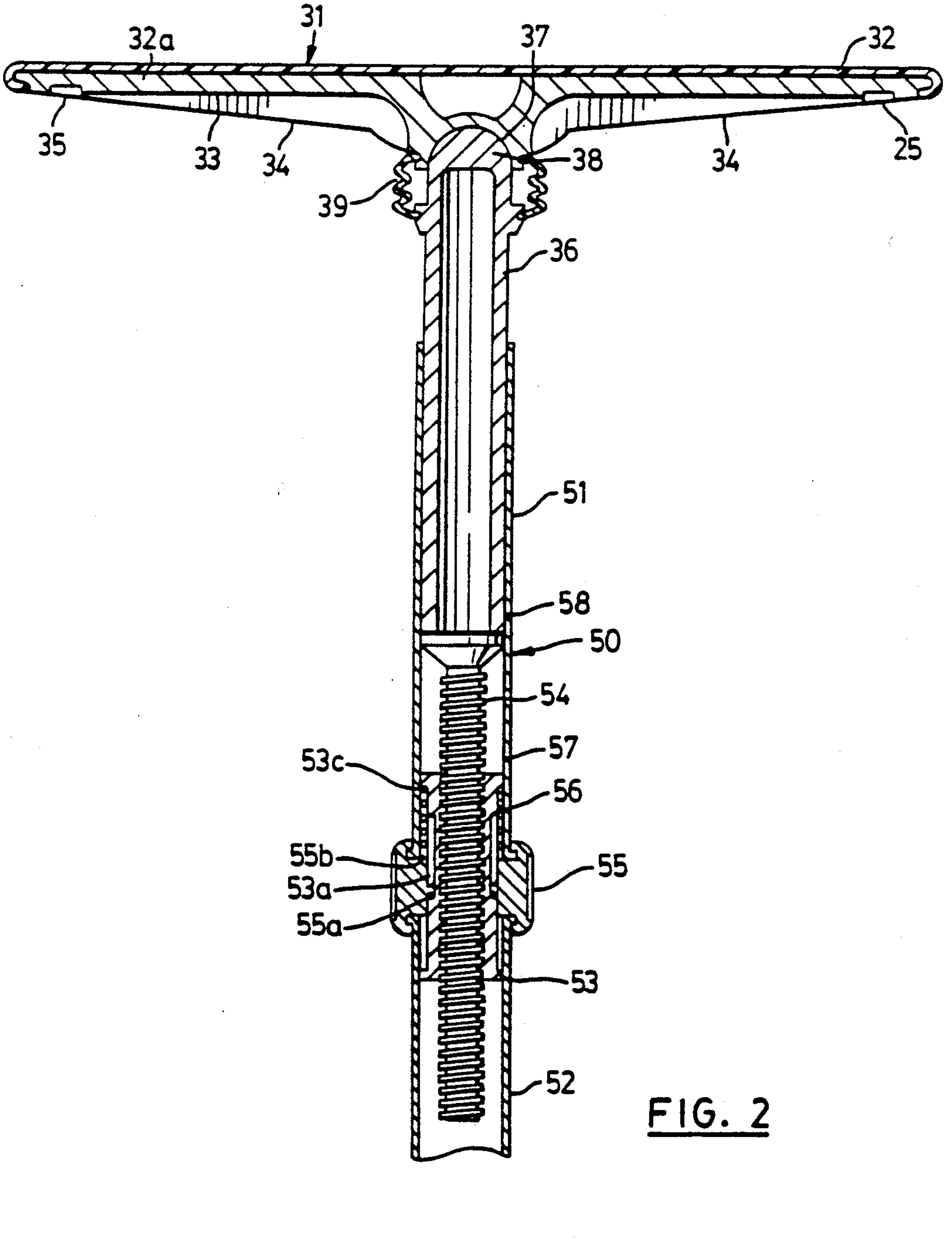
FIG. 2 is an enlarged sectional view of a portion of the structure illustrated in FIG. 1.

Referring now to FIGS. 1 and 2, there is illustrated a safety support structure shown generally at 10, which comprises a post 20 having an upper end 30, a lower end 40, an adjustment means 50 and an accessory mounting region 60 comprising part of the length of the post 20 between its upper and lower ends.

The upper end 30 comprises an upwardly presented ceiling engaging surface 31 (FIG. 2) which is adapted to abut against a ceiling surface 70. The surface 31 comprises a friction pad 32 which enhances the ability of the structure 10 to remain firmly in place after installation. Pad 32 is made of a compressible material, e.g. polyvinylchloride which also enables the upper end 30 to abut firmly and relatively evenly against uneven ceiling surfaces. The upper end 30 also comprises a circular plate 32*a*, of strong rigid material and diameter about 12 inches, adequately to spread the pressure over an appropriate area of ceiling. The plate 32*a* underlies the pad 32, and has a lower surface 33 which includes a plurality of radially extending reinforcing ribs 34 extending to a point short of the periphery thereof. The lower surface 33 of plate 32*a* is also provided with a circumstantial groove 35 near its periphery which further enhances the flexibility of the plate 32*a* and hence the upper end 30.

Lower surface 33 connects to an elongate member 36, forming part of the post 20, by a ball joint which comprises cooperating part-spherical surfaces 37 and 38 of the plate lower surface 33 and post elongate member 36, respectively. The ball joint also comprises a flexible locking sleeve 39 which serves to keep surfaces 37 and 38 in abutment. Thus, the ball joint provides limited relative angular adjustment between upper end 30 and the main post to allow structure 10 to be used with non-horizontal ceiling surfaces, or at small deviations from the vertical.

Lower end 40 also comprises an enlarged circular plate with a downwardly presented surface 41 (FIG. 1), capable of firmly abutting against a floor surface 80, and spreading the load over an enlarged floor area.

The adjustment means 50, as best shown in FIG. 2, comprises an upper adjustment case 51, a lower adjustment case 52, an adjustment nut 53, a piston 54, an adjuster 55, an adjustment coil spring 56, and an elongated, vertically extending slot or window extending from 57 to 58 in the upper case 51. Spring 56 may be constructed of any suitable material such as metal, plastic and the like. The adjustment nut 53 and piston 54 are in a threaded cooperating relationship. Adjuster 55, which is manually rotatable, includes a key portion a which protrudes into a vertically elongated slot 53*a* located in adjustment nut 53, so that rotation of adjuster 55 causes rotation of nut 53 relative to piston 54 as the key engages the side of the slot. The nut 53 can however move vertically relative to the adjuster 55 with the key 55*a* moving up the slot 53*a*.

The upper end of adjustment nut 53 is circumferentially out-turned to form an upper ledge 53*c* against which the upper end of spring 56 bears. The lower end of coil spring 56 is seated on the upwardly presented internal surface 55*b* of the adjuster 55. Thus, spring 56 can exert force urging upward movement of nut 53, and hence piston 54, relative to upper case 51 when compressed. Piston 54 and post elongate member 36 abutting the top surface thereof are slidable within upper case 51.

To install, the structure 10 is held in a substantially upright position and adjuster 55 is rotated. This results in concurrent rotation of adjustment nut 53 relative to piston 54, by abutment of key portion 55*a* against the sidewall of slot 53*a*. Rotation of adjustment nut 53 causes upward movement of piston 54 due to the threaded cooperating relationship between adjustment nut 53 and piston 54. As piston 54 moves upwardly, it moves elongate member 36 of upper end 30 upwardly until ceiling engaging surface 32 abuts against ceiling surface 70. At this point, further rotation of adjuster 55 results in the downward movement of adjustment nut 53 relative to piston 54 which is firmly abutted against upper end 30, with consequent compression of spring 56. As this occurs, key 55*a* on the adjuster 55 effectively moves up the elongated slot 53*a* in the adjuster nut. The further the nut 53 moves down, the greater the compression of the spring 56 and the greater the pressure thereby exerted against the ceiling surface 70. Accordingly, the position of nut 53 provides an indication of the pressure being exerted by the post against the ceiling. Viewing the nut 53 through the slotted window 57, 58 in the upper case 51, and comparing its position with reference to this slotted window, e.g. by registration of its out-turned upper ledge 53*c* with indicia alongside the window, gives the operator an indication that the post is under enough longitudinal pressure to be safely and firmly installed, but not under so much pressure that it may damage the ceiling surface. The initial load capacity of spring 56 and approximate length of the post are conveniently preset on manufacture and assembly, to minimize the adjustment needed on installation.

Figure 3:
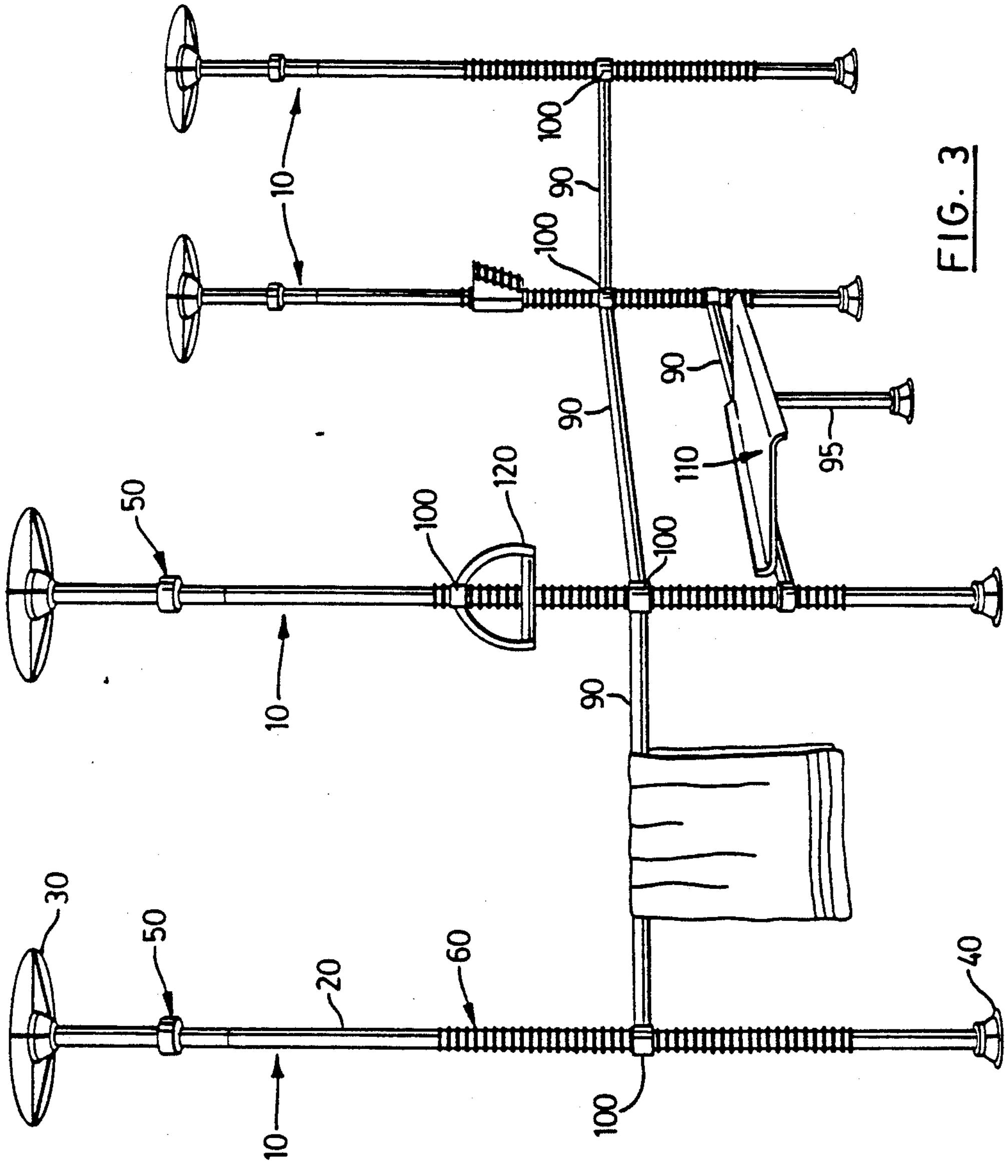
FIG. 3 is a perspective view of a plurality of safety support structures connected to a plurality of laterally extending support accessories.

Referring now to FIG. 3, there is illustrated a plurality of safety support structures 10, each of which comprises a post 20, an upper end 30, a lower end 40, an adjustment means 50 and an accessory mounting region 60. Further, there is illustrated a plurality of horizontal support accessories 90 which are connected to accessory mounting region 60 of support structures 10 at connection 100. Still further, there is illustrated a vertical support accessory 95 which serves to support a seat portion 110. Handle 120 is connected to accessory mounting region 60 by connection 100, and may suitably be used to assist a user to stand up after sitting on seat portion 110. Light unit 130 is connected to accessory mounting region 60 and may be positioned to supplement poorly lit areas.

Figure 4:
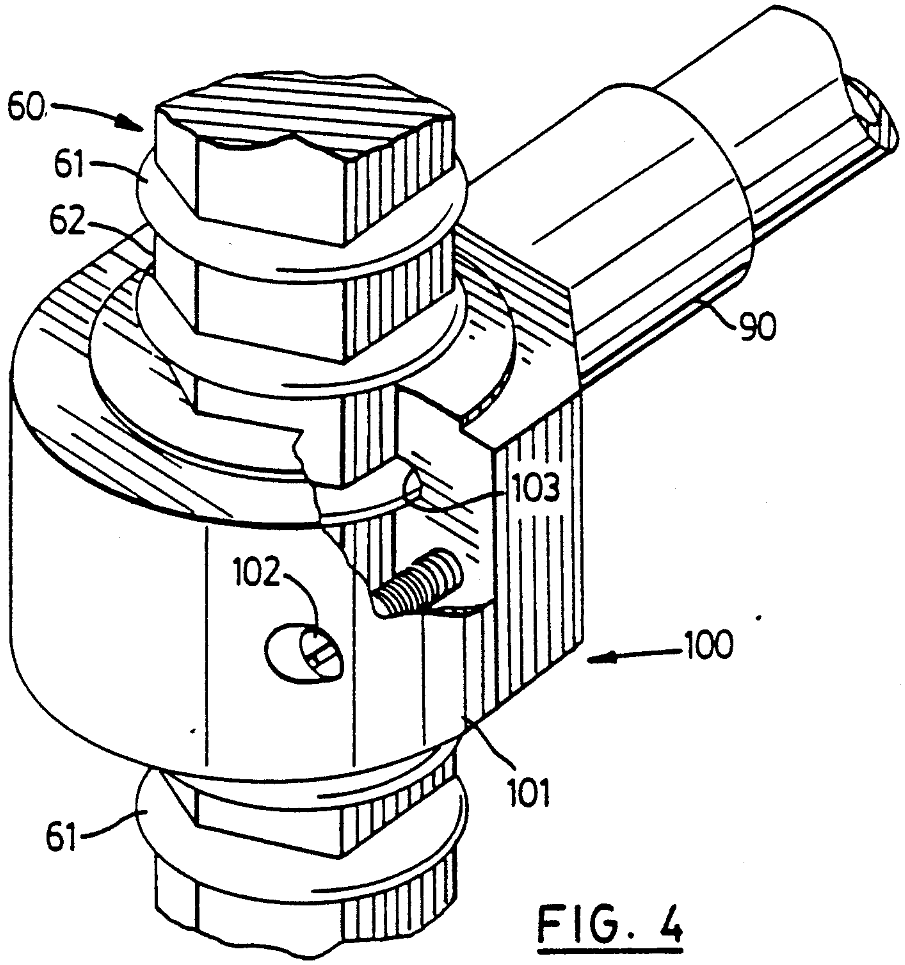
FIG. 4 is an enlarged perspective view of the connection between a safety support structure according to FIG. 1 and a laterally extending accessory.
Figure 5:
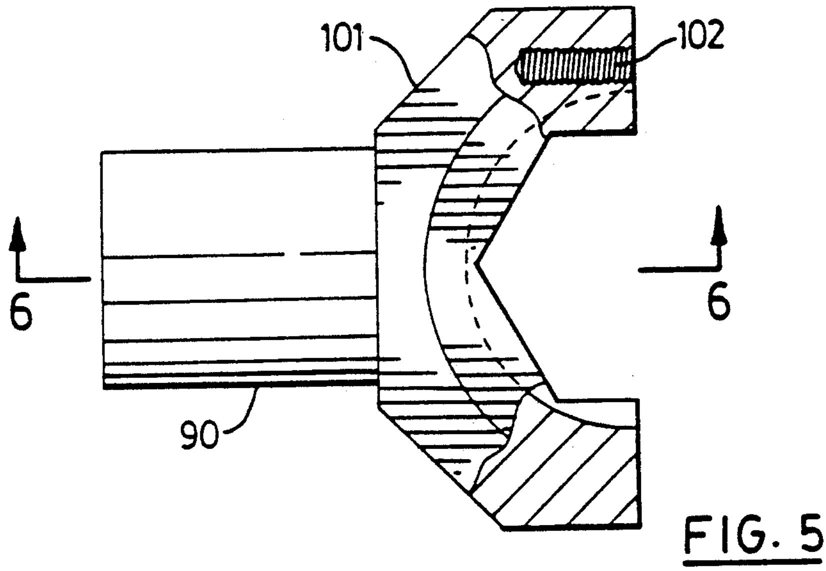
FIG. 5 is a plan view of part of the connection shown in FIG. 4.
Figure 6:
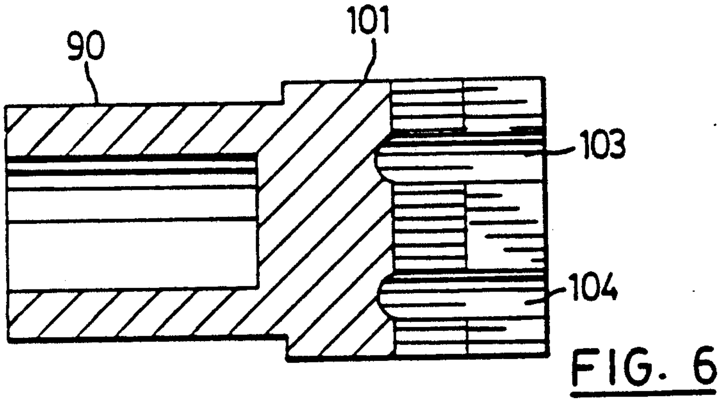
FIG. 6 is a section on the line A—A of FIG. 5.
Figure 8:
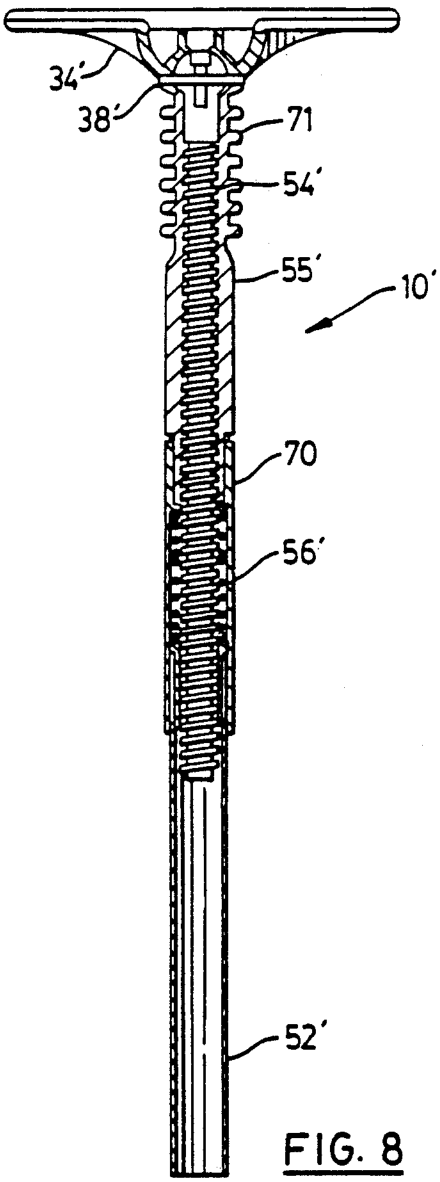
FIG. 8 is a cross-sectional view of the portion shown in FIG. 7.
Figure 7:
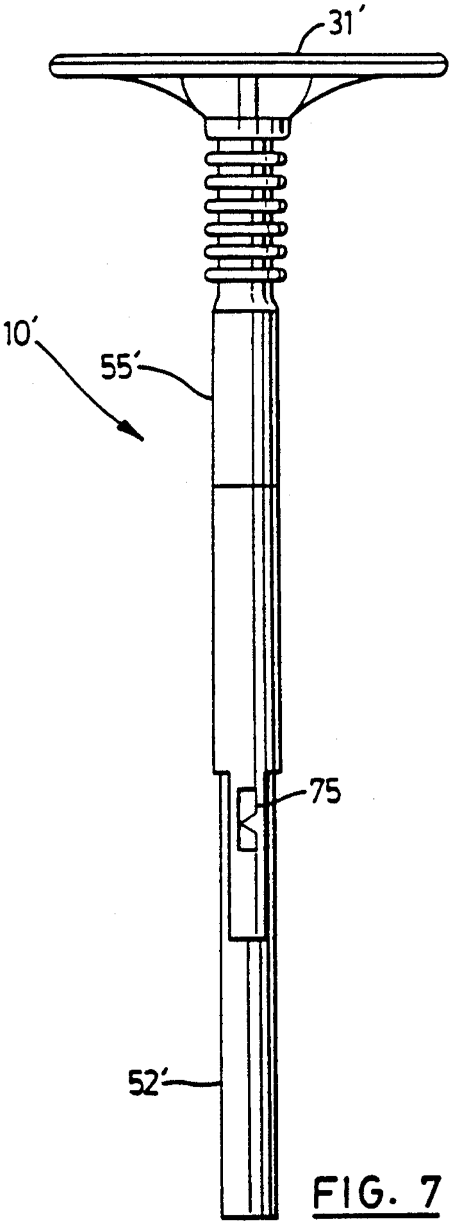
FIG. 7 is a side view of a portion of another embodiment of a safety support structure.
Figure 9:
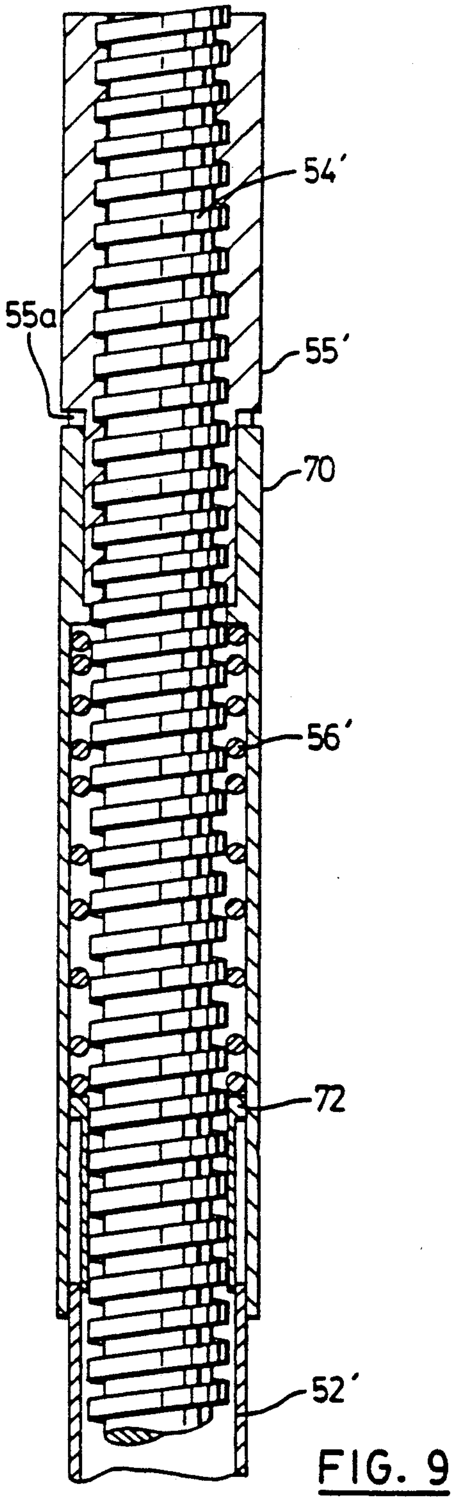
FIG. 9 is an enlarged view of a portion of the structure shown in FIG. 8.
Figure 10:
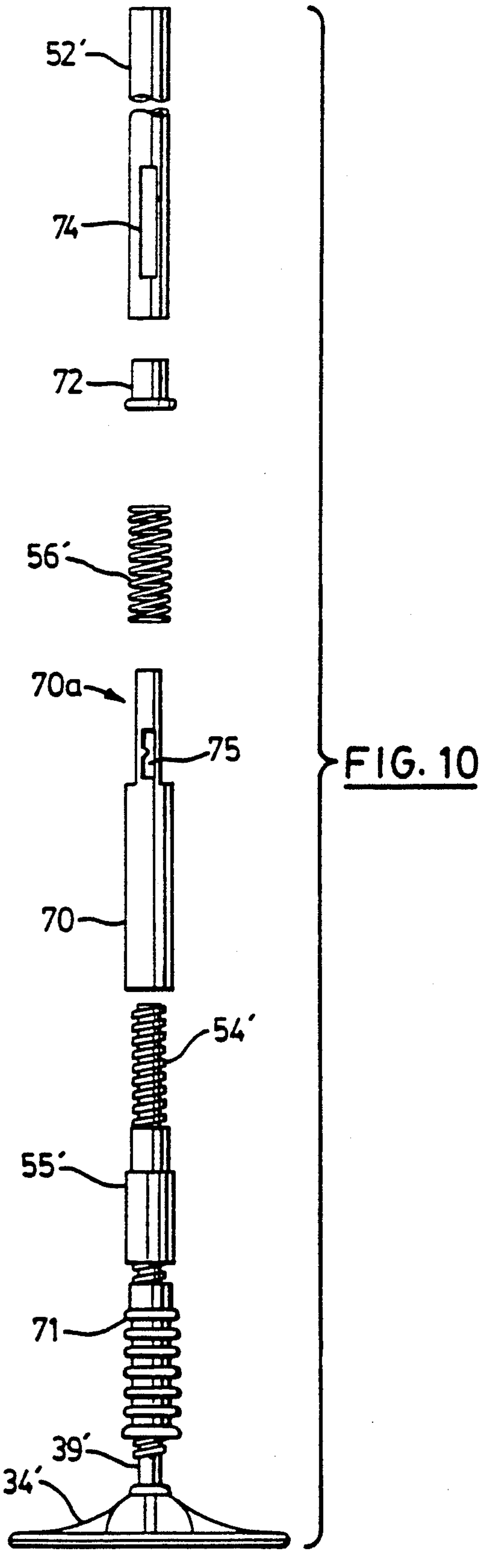
FIG. 10 is an exploded side view of the portion shown in FIG. 7.

FIGS. 4, 5 and 6 illustrate the preferred form of connection 100 to accessory mounting region 60. Accessory mounting region 60 comprises a plurality of longitudinally spaced circumferential ribs 61 having a circular cross-section. The region 62 between the ribs has a hexagonal cross-section. Connection 100 comprises a connecting sleeve 101 with a cooperating hexagonal bore, the sleeve being in two parts, clamped to engage region 62 by set screws 102. The hexagonal cross-section serves to inhibit rotation of the connection 100 with respect to the accessory mounting region 60. The inner surface of sleeve 101 is provided with circumferential grooves 103, 104 appropriately sized, shaped and spaced so as to engage an adjacent pair of ribs 61 to provide positive engagement and resistance to relative vertical movement of the sleeve 101 to post 60. FIG. 5, it will be appreciated, shows one half of a connector, which is completed with a complementary shaped portion carrying the set screws. Connector 101 may be suitably connected to horizontal accessory support 90 or a variety of other accessory supports such as handles, towel holders, light units and the like, as illustrated in FIG. 3, to provide an extensive and versatile safety support structure.

Referring now to FIGS. 7 to 10, another embodiment of the safety support structure 10′ is shown having a different adjustment mechanism than the structure shown in FIGS. 1 to 6. In these Figures, like reference numerals will be used to indicate like components with a "′" added for clarity.

In the embodiment shown in these Figures, the elongate member 36 is removed and the threaded rod 54′ extends upwardly through the post wherein it engages with the headplate. The adjuster 55′ is in the form of a threaded nut and mates with the rod 54′ below the headplate. The adjuster 55′ includes a lower end having a reduced diameter which mates with a sheath 70. A bearing 55a is disposed between the upper surface of the sheath 70 and the adjuster to facilitate rotation of the adjuster with respect to the sheath. A rubber boot 71 surrounds the threaded rod 54' above the adjuster 55' and extends from the upper end of the adjuster to the headplate. A coil spring 56' is disposed below the adjuster 55' within the sheath 70 and abuts against the sheath at one end. The other end of the coil spring 56' abuts against a spring cap 72 that is held in position against axial movement by the lower adjustment case 52'. The sheath 70 includes an indicating section 70a having a window 75. The lower adjustment case 52' includes a decal 74 which is used in combination with the window 75 to give an indication of force exerted by the structure 10' on the ceiling and the floor.

In operation when it is desired to secure the structure 10, between the floor and the ceiling, the adjuster 55' is rotated. Since the coil spring 56' applies a movement restraining force to the adjuster 55' while the headplate is spaced from the ceiling the rotation of the adjuster causes the rod 54' to advance so that the headplate moves upwardly and abuts with the ceiling. When this occurs, further rotation of the adjuster 55' causes the adjuster to advance downwardly along the rod 54'. Advancement of the adjuster 55' downwardly forces the sheath 70 downwards along the rod 54'. Since the spring cap 72 is held in position by the lower adjustment casing 52', the downward movement of the sheath 70 causes the spring 56' to compress resulting in an increased force being applied by the structure 10' between the floor and the ceiling. Furthermore, as the adjuster 55' is rotated and the sheath 70 moves downwardly to compress the spring 56', the window 75 advances downwardly over the lower adjustment casing 52' so that the window 75 passes over the decal 74. When the notch provided on the window is in alignment with the specified marking on the decal, an indication is given that the structure 10' is secured between the ceiling and the floor in a manner such that the force exerted by the structure is sufficient to prevent slippage whilst preventing damage to either the ceiling or the floor. This design reduces the cost of the structure since the adjustment mechanism is simplified.

The safety support structure may be constructed out of any suitable material such as metal, plastic or the like. Preferably, as many of the components of the support structure as possible are constructed out of plastic, even the spring of the adjustment means, so that the structure is well adapted for use in kitchens, bathrooms and other moist areas, without corrosion risk. Preferably the safety support structure comprises a plurality of drainage channels along the post 20 and in the lower end 40 thereof, to prevent liquids from collecting therein.

The size of the posts 10, adjuster 55 and the other items is dictated to a large extent by ergonomics, so that they can be readily gripped by the user. Tubing of approximately 1½ inches diameter is generally suitable. This in turn influences the dimensions of the attachment means. When cooperating ribs 61 and grooved sleeves 101 as illustrated are chosen as the attachment means, good versatility in mounting positions, along with firm positive engagement within the 1½ inch post diameter range, are advantageously obtained by utilizing two adjacent ribs, spaced approximately ¾ inch apart, center to center.

It will be appreciated that this illustrated form of accessory mounting region and connection means, although particularly advantageous, is exemplary only. The cross-section can be other than hexagonal, although circular or elliptical cross-sections are best avoided for provision of firmest positive engagements. Circumferential ribs on the posts utilized in pairs are also a preferred, advantageous feature, but not essential. Other clamping protrusion formations could be adopted, even locking pins received in apertures in the respective structural components. Connection means utilizing drilled holes and the like are however preferably avoided because of their tendency, over extended period of use, to provide points of weakness and points of initial corrosion. The same connector may carry a plurality of mounting accessories, extending at different angles therefrom. The connector may be hinged, and clamped by means of a single set screw, when it is only intended to carry a single accessory.

It also should be realized that the plates 32a and 41 need not be circular but can be formed in any shape that adequately spreads the pressure over an appropriate area of the ceiling and floor. Furthermore, the ball joint may be replaced using other various pivotal couplings. Moreover, the coupling between post and the upper plate may be fixed while accommodating any required pivoting of the upper surface of the plate via the compression pad. Although the pivotal coupling of the lower surface 33 to the elongate member 36 can be removed, it is preferred since it allows the engaging surface 31 to remain flush with the ceiling when the structure 10 is used with non-horizontal ceilings.

We claim:

1. A safety support structure for assisting the elderly or physically handicapped comprising:

a post having an upper end adapted to abut firmly against a ceiling surface, a lower end adapted to abut firmly against a floor surface, and an accessory mounting region disposed between said upper and said lower ends;

length adjustment means on said post, for adjusting the unstressed length of the post between said upper end and said lower end; and pressure indicating means on said post, adapted to indicate whether the pressure on said structure, when positioned to abut against a floor surface and a ceiling surface as aforesaid, lies inside or outside a predetermined range;

wherein said accessory mounting region comprises an intermediate length of said post carrying mounting formations, said mounting formations being in the form of a plurality of longitudinally spaced ribs, said accessory mounting region for receiving and co-operating with laterally extending support accessories clamped to said accessory mounting region, said accessory mounting being configured to resist positively axial and/or rotational displacement of support accessories clamped to said accessory mounting region relative to the post.

2. The support structure of claim 1, wherein said upper end comprises an upwardly presented ceiling engaging surface of large surface area relative to the cross-sectional area of the post.

3. The support structure of claim 1, wherein said upper end comprises a downwardly presented surface which comprises a plurality of reinforcing ribs radially and centrally disposed from said downwardly presented surface to a point short of the periphery thereof.

4. The support structure of claim 1, wherein said upper end is rotatably and pivotally connected to said post.

5. The support structure of claim 1 wherein said lower end comprises a downwardly presented floor engaging surface of larger surface area relative to the cross-sectional area of said post.

6. The support structure of claim 1, wherein said length adjustment means comprises an adjuster, a piston which is raisable and lowerable in response to manual movement of the adjuster to alter the overall length of the support structure, and a compression spring acting between the adjuster and the piston, the tension of said spring being varied by relative movement between the adjuster and the piston.

7. The support structure of claim 1, wherein said longitudinally spaced ribs have a circular cross-section and protrude circumferentially from said accessory mounting region.

8. The support structure of claim 1 wherein said longitudinally spaced ribs are equidistantly spaced.

9. The support structure of claim 2, further comprising a friction pad positioned at said upper end, one surface of said friction pad defining said upwardly presented ceiling engaging surface.

10. The support structure of claim 2, wherein said upper end is flexible.

11. The support structure of claim 10, wherein said upper end is adapted to be flexible by providing a circumferential groove therein.

12. The support structure of claim 6, wherein said adjuster cooperates with and causes rotation of an adjustment nut upon manual movement of the adjuster, said adjustment nut and said position being in a threaded cooperating relationship.

13. The support structure of claim 6 wherein said pressure indicating means comprises a marking on said length adjustment means, a window provided on said post through which said marking is visible, so that visual comparison of the relative positions of the window on the adjustment means indicates whether the pressure is within said predetermined range.

14. The support structure of claim 7, further including an accessory connection clamped to said accessory mounting region, said accessory connection comprising a split sleeve having at least one internal groove adapted to engage at least one of said ribs protruding from the accessory mounting region when clamped in position.

15. The support structure of claim 14, wherein said accessory connection has two internal longitudinally spaced grooves formed therein, said grooves being part circular in configuration and being adapted to engage an adjacent pair of said ribs when clamped in position.

16. The support structure of claim 7, wherein the cross-section of said accessory mounting region interposed between said ribs is non-circular and the ribs thereon are equidistantly spaced.

* * * * *